April 28, 1970          A. GHILE          3,509,396
SINGLE PHASE MOTOR INCLUDING A CAGE WITH SPECIALLY
PROFILED PARTS
Filed March 18, 1968
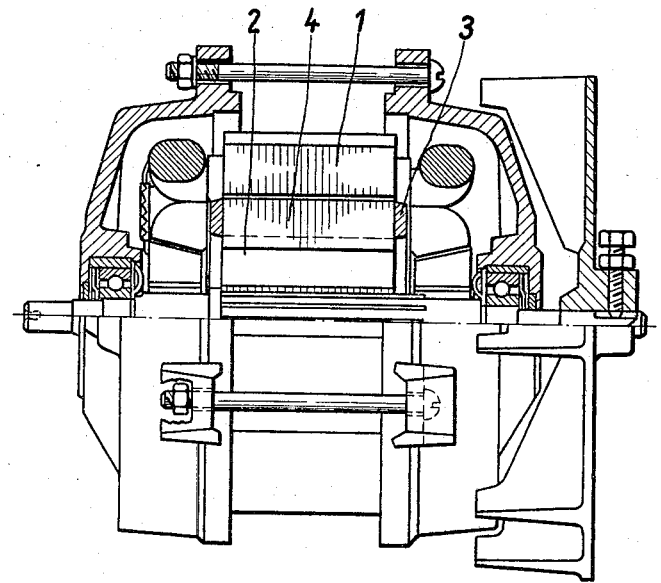
Fig. 1
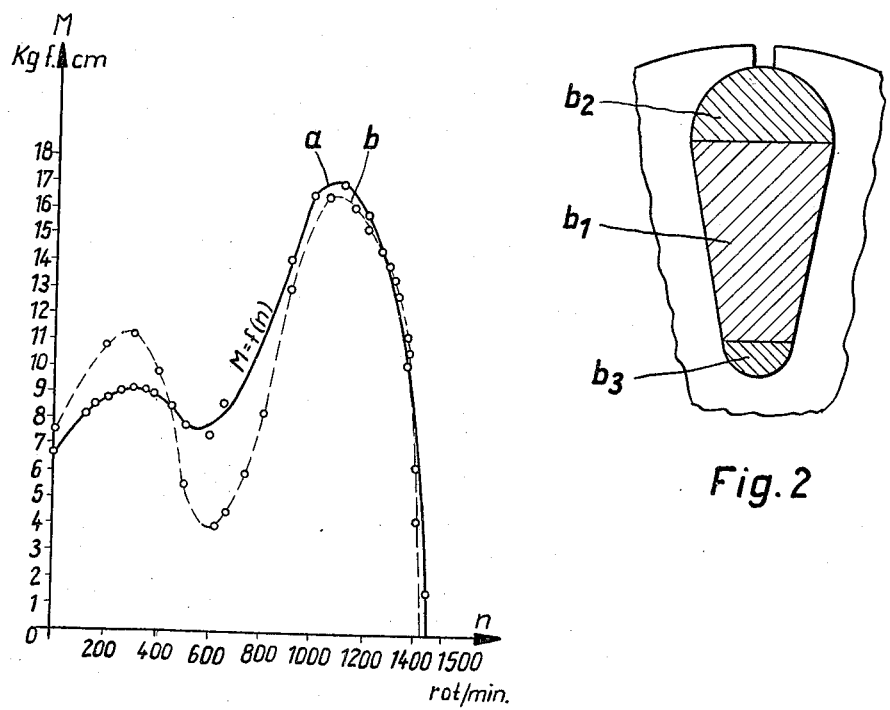
Fig. 2
Fig. 3

United States Patent Office 3,509,396
Patented Apr. 28, 1970

3,509,396
SINGLE PHASE MOTOR INCLUDING A CAGE WITH SPECIALLY PROFILED PARTS
Aurel Ghile, Remus, Rumania, assignor to Ministerul Industriei Constructillor de Masini, Bucharest, Rumania, a corporation
Filed Mar. 18, 1968, Ser. No. 713,865
Claims priority, application Rumania, Mar. 18, 1967, 53,356
Int. Cl. H02k 17/16, 17/22
U.S. Cl. 310—211      3 Claims

ABSTRACT OF THE DISCLOSURE

A single phase motor with screened poles and with a rotor made of a stack of laminations bearing an aluminum cage cast in the rotors slots. The cage includes bars of a cross-section of a trapezoidal shape completed by semicircles adjacent the two bases of the trapezoid. The cage is provided with frontal short-circuiting rings. The ratio between the total section area of the bars and the section area of the short-circuiting ring has a value of 22–24. The ratio between the area of the trapezoidal part of each bar and the sum of the semicircular areas is 2.7–2.3.

---

This invention relates to a single phase motor with screened poles.

There are known many types of motors with screened poles of various sizes, power ratings and designs.

All known motors of the above type have the disadvantage that, because of the great amount of high order harmonics of the magnetic field which arise in the airgaps, the motors produce annoying magnetic noise, which reaches the level of 75–80 db and the curve of couple of which as a function of the rotative speed shows a pronounced saddle. Also, eddy current loss in these motors is comparatively large.

An object of this invention is to eliminate the disadvantages of the known motors.

According to the invention, a single phase motor may have the stator built in any known manner. The motor's rotor is also built in usual manner from a stack of laminations provided with slots of trapezoidal shape completed by semicircles adjacent the cases of the trapezoid, the channels of the slots having an inclination with respect to the rotor's spindle. The rotor carries an aluminum cage cast in these slots and including frontal rings short-circuiting the cage's bars which are located in the slots.

According to the invention, the rotor is built so that the ratio of the total sectional area of the slots in the rotor and the sectional area of the short-circuiting ring has a value of 22–24, and preferably 23.

It has been established experimentally that, with this construction, one achieves:

An important reduction of high order harmonics of the magnetic field which arise in the airgap and, thereby, a reduction of the level of the annoying magnetic noise, known to this type of motor, from 75–80 db to 50–60 db;

An advantageous modification of the coupling curve of the motor as a function of its rotation and speed, by substantial elimination of the saddle from the curve;

A reduction of 20–30% in amount of laminations and winding wire; and

A reduction of 15–20% of power loss for low loads.

As another constructive characteristic, according to the invention, the ratio between the area of the trapezoidal part of the rotor's slot with respect to the sum of the slot's semicircular areas must have a value of 2.7–3.3 and preferably 3.

In order to achieve these conditions, the height of the trapezoidal part of the slots is changed.

By this construction, one achieves a reduction of the high order harmonics of the magnetic field which arise in the airgap and, consequently, a total reduction to a satisfactory level of the noise of motors with screened poles.

In the following is given an example of the invention as illustrated in the drawing in which:

FIG. 1 is a longitudinal section through a motor of the invention;

FIG. 2 illustrates a rotor slot; and

FIG. 3 illustrates a coupling curve as a function of rotational speed.

The single phase motor illustrated in the drawing includes a stator 1 including interconnected poles with either poles having extensions without magnetic bridges or with open poles bridged by magnetic bridges.

The rotor 2 is made from a stack of laminations provided with slots. A cage is employed which has aluminum bars cast in these slots. The bars have individual sections $b_1$, $b_2$, and $b_3$ with a total sectional area. The cage includes short-circuiting rings 3 of aluminum, each having a sectional area $S_k$.

The slots 4 and the bars therein each have a sectional area S which includes a trapezoidal part having an area $S_1$, with semi-circular parts adjacent the bases and having areas $S_2$ and $S_3$, respectively. For the total slots or bars, $S_1$ designates the area of the trapezoidal parts and $S_2$ and $S_3$, respectively, the areas of the semi-circular parts adjacent the bases of the trapezoidal parts.

In the rotor's construction:

The ratio $K_i$ between the total sectional area of the rotor's slots S and the section area $S_k$ of the short-circuiting ring has a value of 23, namely $$K_i = \frac{S}{S_k} = 23$$

The ratio $K_c$ between the total sectional area $S_1$ of the trapezoidal parts of the slots and the total sectional area of the semi-circular completions of the slots $S_2$ and $S_3$ has the value 3, namely $$K_c = \frac{S_1}{S_2 + S_3} = 3$$

A single phase motor with screened poles, built to fulfill these conditions, has a mechanical coupling with a variation as a function of number of rotations per unit time according to the curve $a$ in FIG. 3, i.e. practically without a saddle. In comparison with this, the curve $b$ corresponds to the variation of motor coupling as a function of rotational speed for the same motor whose construction with regard to the slots and short-circuiting rings is the known one.

Moreover, the motor built according to the invention, has its light running loss reduced by 15–20%, and the noise generated by the magnetic field harmonics is reduced to 50–60 db, in comparison with motors having known construction and whose noise is 75–80 db.

The motor of the invention provides the following advantages:

At low load running, it has less loss in a proportion of 15–20% and results in an important decrease of power consumption;

The saddle, which is a characteristic for known motors, is practically eliminated; the starting moment is stronger so that one may use electromotors with a lesser power rating in the proportion of 10–15%; the motor is built with a reduced consumption of materials in a proportion of approximately 20–30%;

It produces a magnetic noise reduced in a proportion of approximately 20–25% measured in db which is an important advantage in the case of domestic equipment.

I claim:

1. A single phase motor comprising a rotor and a stator in operative association, said stator including screened poles, said rotor including a stack of laminations provided with a plurality of axially aligned slots and an aluminum cage surrounding the stack and including bars on the slots and rings connecting the bars at the ends of the rotor, the bars and slots each having a sectional area consisting of a trapezoid with semi-circular sections on the bases of the trapezoid, the ratio of the total sectional areas of the bars to the sectional area of one of the rings being 22–24 and the ratio of the sectional area of the trapezoid to that of the semi-circular sections being 2.7–3.3.

2. A motor as claimed in claim 1 wherein the first said ratio is 23.

3. A motor as claimed in claim 2 wherein the second said ratio is 3.

References Cited

UNITED STATES PATENTS

| | | | |
|---|---|---|---|
| 1,819,148 | 8/1931 | Coates et al. | 310—211 |
| 1,819,228 | 8/1931 | Coates | 310—211 |
| 2,657,324 | 10/1953 | Korski | 310—211 |
| 3,242,361 | 3/1966 | Varner et al. | 310—211 X |

WARREN E. RAY, Primary Examiner